June 15, 1954 H. W. OSBURN 2,681,076
FLUID CONTROL VALVE
Original Filed July 17, 1945 2 Sheets-Sheet 2
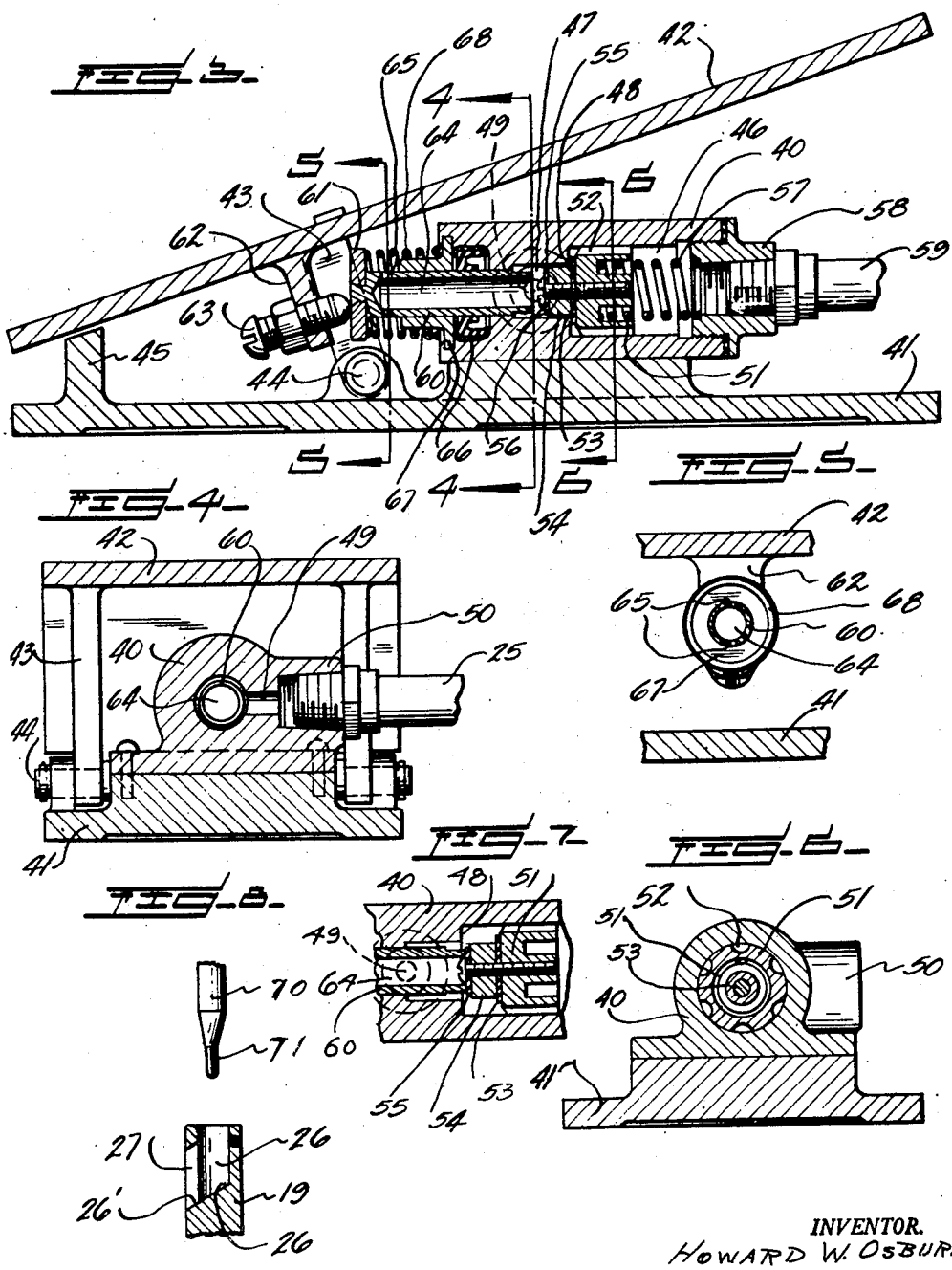
INVENTOR.
HOWARD W. OSBURN
BY
ATTORNEY.

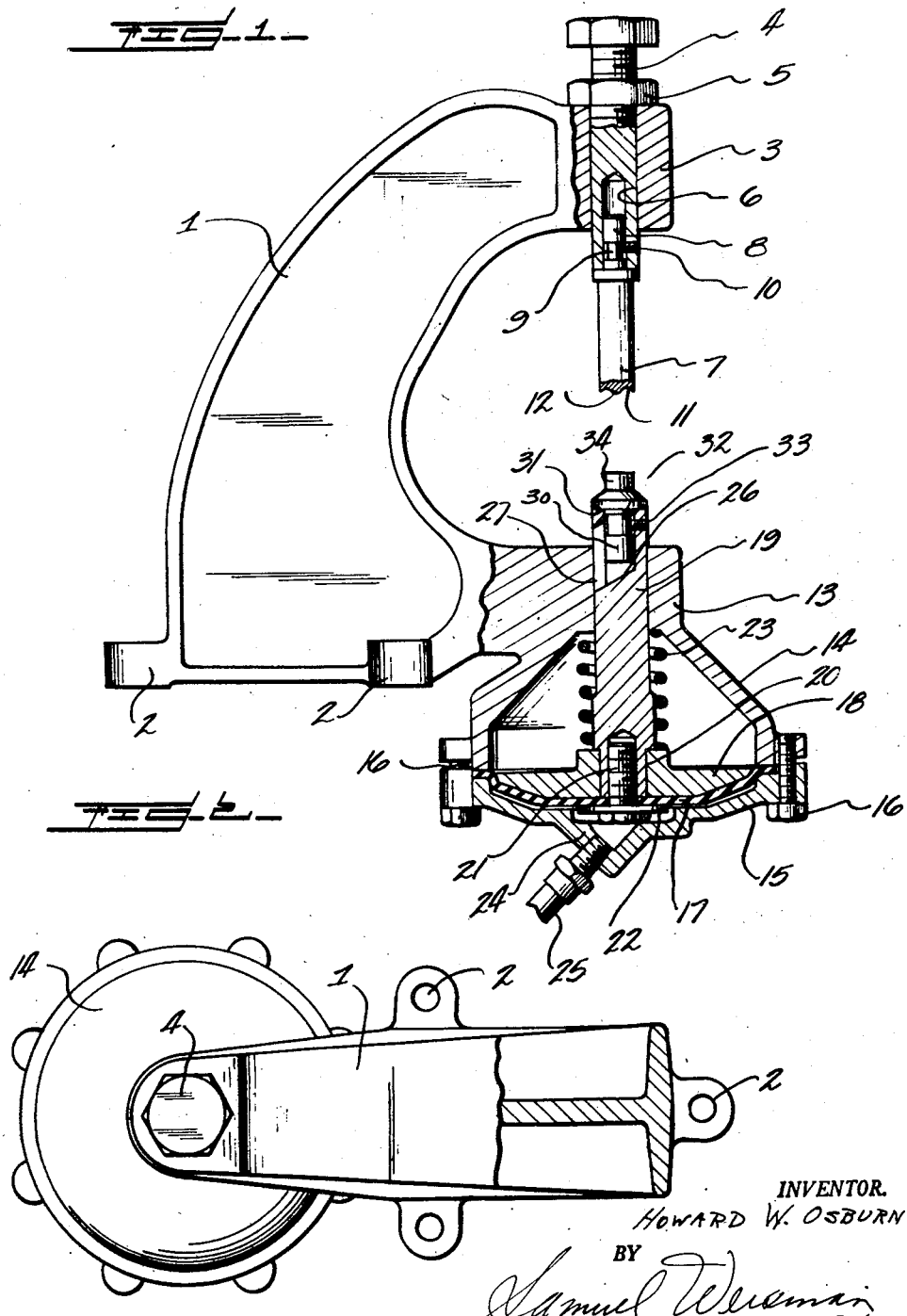

Patented June 15, 1954

2,681,076

UNITED STATES PATENT OFFICE 2,681,076

FLUID CONTROL VALVE

Howard W. Osburn, Detroit, Mich., assignor to Power Brake Parts Manufacturing and Sales Company, Detroit, Mich., a corporation of Michigan Continuation of application Serial No. 605,574, July 17, 1945. This application July 20, 1951, Serial No. 237,765

6 Claims. (Cl. 137—620)

This application is a continuation of my co-pending application Serial No. 605,574, filed July 17, 1945, and now abandoned.

The present invention pertains to a novel fluid control valve designed primarily for use in the operation of hydraulic brakes or a fluid operated machine such as a punch or press, although not necessarily limited thereto.

The invention is herein described in connection with a riveting machine wherein the work is brought under pressure against a forming tool, or vice versa. The work with the rivet set therein is mounted on a support in the machine, and fluid pressure is employed for producing a squeezing and shaping operation on the rivet. Ordinarily the supporting part and the shaping part of the machine are brought together in a rapid movement on opening of the fluid control valve. However, if the relative movement of the part is slow initially, it permits the operator to make a final and more accurate adjustment of the work piece if necessary. The principal object of the invention is to provide a control valve whereby such interrupted movement between the work piece and the forming member is accomplished.

For this purpose the control valve is so constructed that the initial opening movement thereof permits only a limited quantity of fluid to pass. The corresponding low pressure, or the slow building up of the pressure, brings the work and the forming tool fairly close together but not in contact with each other and with only very slow relative movement towards each other. The operator is thereby given ample time to make the necessary final adjustment. In fact, the full pressure is not applied to the machine until the valve is further actuated, as by means of a pedal or lever.

In the more specific embodiment of the invention, the valve housing is formed with a valve seat between the inlet and outlet thereof. A plug slidable in the chamber is adapted to close on this seat and is formed with a longitudinal passage through which fluid flows when the plug is removed from the seat. The plug, however, carries an extension having a somewhat loose sliding fit in the chamber between the valve seat and the outlet and which maintains this relation when the plug is initially removed from its seat. Thus, on the initial opening of the valve, the flow is materially restricted by the extension and furnishes the preparatory relative movement of the parts described above. When the operator has accurately positioned the work, he actuates the valve still further, whereby the restricting extension of the valve plug is moved entirely away from the valve seat and no longer interferes with maximum flow of fluid through the seat to the outlet.

The invention is fully disclosed by way of example in the following description and in the accompanying drawings in which:

Figure 1 is a vertical section of the device, partly in elevation;

Figure 2 is a plan view thereof, partly in section;

Figure 3 is a longitudinal section of the valve and pedal therefor;

Figure 4 is a section on the line 4—4 of Figure 3;

Figure 5 is a section on the line 5—5 of Figure 3;

Figure 6 is a section on the line 6—6 of Figure 3;

Figure 7 is a section similar to Figure 3, showing a different position of parts, and Figure 8 is a detail of the Figure 1, showing a rivet removing tool substituted for the riveting tools.

Reference to these views will now be made by use of like characters which are employed to designate corresponding parts throughout.

In Figure 1 is shown a curved frame member 1 having its base formed with a series of apertured ears 2 for bolting to a bench or other support. The upper end of the frame is formed as a boss 3 on a vertical axis into which is screwed a bolt or stud 4 secured in adjusted position by a lock nut 5.

A recess 6 is drilled in the member 4 from the bottom thereof in order to receive a tool, in this case a rivet grooving or beading tool 7. One end of the tool is reduced at 8 to fit in the cavity 6 and is formed with a peripheral groove 9 to receive a locking set screw 10 passed through the wall of the cavity 6. The lower end of the tool is formed with a circular groove 11 around a rounded tip 12 adapted to enter the hole of the rivet while the groove or bead is being formed.

Opposite the boss 3, the frame 1 is formed with a jaw 13 beneath which is formed a bell housing 14 providing a chamber as will presently appear. A bottom plate 15 is secured to the housing 14 by a suitable number of bolts 16.

Between the members 14 and 15 is clamped a flexible diaphragm 17 on which is mounted a plunger plate 18. A plunger 19 is slidably mounted in the jaw 13 in axial alinement with the tool 7 and has its lower end 20 reduced and received in the plate 18. A stud 21 passed through the diaphragm 17 and into the reduced end 20 clamps a washer 22 against the diaphragm and thus holds the several parts together. A coil spring 23 surrounds the lower part of the member 19, bearing against the jaw 13 and the plate 18 to retract the member 19 into the chamber 23 of the housing 14. Obviously, these parts are assembled before the bottom plate 15 is fastened.

The plate 15 is formed with a rearwardly extending tapped nipple 24 to which a pressure fluid supply line 25 is suitably coupled. The upper end of the plunger 19 is formed with an axial recess 26 having a relatively wide lateral outlet 27 through the wall of the member 19, for a purpose that will presently be described.

The socket 26 receives the shank of a rivet punch 30 formed at its upper end with a shoulder 31 that rests upon the plunger. The tool is formed with a peripheral groove 32 for locking by means of a set screw 33 inserted through the wall of the member 19. The upper exposed end of the punch 30 is formed as a reduced cylindrical head 34 of such size as to support a rivet blank mounted thereon.

The rivet is first inserted in the parts to be fastened together, such as a brake shoe and brake lining, and in this condition the rivet is mounted on the head 34. By means of pressure fluid admitted into the line 25, the tool 30 and the work are forced against the beading tool 7, whereby the rivet is flattened and grooved against the work.

The valve mechanism for controlling flow of fluid into the line 25 embodies a substantially cylindrical housing 40 mounted on an enlarged flat base 41 adapted to lie on the floor. An operating pedal 42 is mounted over the base and provided on its lower surface with lugs 43 pivotally attached to the base at 44. One end of the pedal stops against a rest 45 formed on the base.

The chamber 46 of the housing 40 is reduced internally intermediate its ends at 47 to form a restriction. At the end of the portion 47 facing the inlet end of the housing is formed a valve seat 48 for a purpose that will presently appear. A lateral port 49 is formed through the thickened wall 47 and leads into a nipple 50 that constitutes the fluid outlet to which the intake end of the line 25 is coupled.

The inlet end of the chamber 46 contains a slidable valve plug 51 having longitudinal grooves 52. One end of the plug carries a compressible washer 53 adapted to close on the seat 48. Upon the washer is mounted a collar 54 on which in turn is mounted a smaller compressible washer 55, the parts being held together by a screw 56 threaded into a plug 51. The collar 54 enters somewhat loosely into the restriction formed by the wall 47. A coil spring 57 moves the plug 51 towards the seat 48 and bears against a coupling nut 58 threaded into the inlet end of the housing 40 and receiving a hose 59 leading from a suitable fluid pressure source.

In the wall 47, at the opposite side of the port 49, is slidably mounted a pusher rod or tube 60 having an external head 61. A lug 62 projecting from the lower surface of the pedal 42 carries an adjustable set screw 63 engageable with the head 61 and adapted to move the member 60 inwardly on depression of the pedal 42.

The pusher 60 is formed with an axial passage 64 from its inner end which is adapted to seat against the washer 55. The passage 64 extends nearly to the head 61 and communicates with a radial hole 65 formed in the pusher and constituting the exhaust port.

The pusher 60 is held in a suitable seal 66 fitted in the body 40 and is also supported in a bearing 67 fastened in the adjacent end of the housing. A coil spring 68 is mounted between the bearing 67 and the head 61 to retract the pusher 60.

In the use of the device the spring 57 normally closes the washer 53 against the seat 48 and thereby closes the exhaust port 49 to pressure. The operator depresses the pedal 42 sufficiently to seat the inner end of the pusher 60 against the washer 55 and to move the washer 53 away from the seat 48 without, however, moving the collar 54 out of the restriction formed by the wall 47. The loose mounting of the collar within the restriction admits sufficient pressure fluid into the outlet port 49 and line 25 to lift the plate 18, the tool 19 and the work thereon towards the tool 7. The elevation of the tool 7 is adjusted by the stud 4 so that the escape of pressure around the collar 54 brings the work into close proximity to the lower end of the tool 7 and substantially at rest in this position. The slow movement of the work permits the operator to adjust the work accurately with respect to the working end of the tool. The operator then depresses the pedal further to remove the collar 54 from the restriction and permits full pressure to flow through the grooves 52 and into the line 25 for further movement of the tool 19 under the high pressure necessary for the forming operation.

On the inward movement of the pusher 60, the exhaust port 65 thereof becomes sealed in the bearing 67. Also, the inner end of the pusher seals against the washer 55, so that there is no escape of fluid through the passage 64. The seal 66 prevents escape of fluid around the pusher.

When the pedal 42 is released and the pusher retracted, the port 65 becomes exposed outside of the bearing 67. The pusher uncovers the outlet port 49, and the pressure beneath the diaphragm 17 is reduced to atmospheric through the passage 64 and exhaust port 65.

The device is especially useful as a master valve for operating hydraulic brakes. On initial pressure on the pedal 42, opening of the restricted passage is slowed down first by the compression of washer 55, and further by the gradual expansion or relief of the compressed washer 53. In this manner, the fluid pressure is built up slowly and gradually in the restricted passage before full opening of the valve, resulting in a smooth initial application of the brakes.

The device is also useful for removing rivets. For this operation the rivet punch 30 is removed, and the beading tool 7 is replaced by a simple punch 70 having a reduced lower end 71. The work is laid upon the plunger 19 with the rivet over the cavity 26 and is brought to the tool 70 in the manner already described. The rivet, on being ejected from the work, falls upon the sloping bottom 26' of the cavity 26 and drops out of the lateral opening 27.

Although a specific embodiment of the invention has been illustrated and described, it will be understood that various alterations in the details of construction may be made without departing from the scope of the invention as indicated by the appended claims.

What I claim is:

1. A pressure fluid control valve comprising a housing having a chamber, a wall portion forming a restriction and a valve seat in said chamber, a valve plug slidably mounted in said chamber, a compressible washer on the closing end of said plug and adapted to close on said seat portion, said plug having a longitudinal passage from end to end, an extension from and movable with said plug, said extension having a restricted fluid-passing sliding fit in said restriction and movable away from said restriction and valve seat, said housing having a port positioned so that said extension lies between said port and said plug, means separate from and slidable toward said extension, and a compressible washer on the free end of said extension and engageable by said means, whereby to slide said extension and said means.

2. A pressure fluid control valve comprising a housing having a chamber, a wall portion forming a restriction and a valve seat in said chamber, a valve plug slidably mounted in said chamber, a compressible washer on the closing end of said plug and adapted to close on said seat, said plug having a longitudinal passage from end to end, an extension from and movable with said plug, said extension having a restricted fluid-passing sliding fit in said restriction and movable away from said restriction and valve seat, said housing having a port positioned so that said extension lies between said port and said plug, and a compressible washer on the free end of said extension, a pusher slidably mounted in said housing and adapted to seat against the second washer whereby to slide said extension and said means, said pusher having a passage from its inner end and an exhaust port from said passage adapted to lie outside of said housing when the pusher is retracted from said extension, and means for sealing said exhaust port when said pusher engages said extension.

3. A pressure fluid control valve comprising a housing having a chamber, a wall portion forming a restriction and a valve seat in said chamber, a valve plug slidably mounted in said chamber, a compressible washer on the closing end of said plug and adapted to close on said seat, said plug having a longitudinal passage from end to end, an extension from and movable with said plug, said extension having a restricted fluid-passing sliding fit in said restriction and movable away from said restriction and valve seat, said housing having a port positioned so that said extension lies between said port and said plug, and a compressible washer on the free end of said extension, a pusher slidably mounted in said housing and adapted to seat against the second washer whereby to slide said extension and said means, said pusher having a passage from its inner end and an exhaust port from said passage adapted to lie outside of said housing when the pusher is retracted from said extension, and a bearing surrounding said pusher and adapted to seal said exhaust port when said pusher engages said extension.

4. A pressure fluid control valve comprising a housing having a chamber, a wall portion forming a restriction and a valve seat in said chamber, a valve plug slidably mounted in said chamber, a compressible washer on the closing end of said plug and adapted to close on said seat, said plug having longitudinal grooves from end to end, an extension from and movable with said plug, said extension having a restricted fluid-passing sliding fit in said restriction and movable away from said restriction and valve seat, said housing having a port positioned so that said extension lies between said port and said plug, means separate from and slidable toward said extension, and a compressible washer on the free end of said extension and engageable by said means.

5. A pressure fluid control valve comprising a housing having a chamber, a wall portion forming a restriction in said chamber, a valve seat formed on one end of said portion, a valve plug slidably mounted in said chamber and adapted to close on said seat, said plug having a longitudinal passage from end to end, an extension from and movable with said plug, said extension having a restricted fluid-passing sliding fit in said restriction and movable fully away from said extension and valve seat, said housing having a port positioned so that said extension lies between said port and said plug, and means for sliding said plug.

6. A pressure fluid control valve comprising a housing having a chamber, a wall portion forming a restriction in said chamber, a valve seat formed on one end of said portion, a valve plug slidably mounted in said chamber and adapted to close on said seat, said plug having a longitudinal passage from end to end, an extension from and movable with said plug, said extension having a restricted fluid-passing sliding fit in said restriction and movable away from said extension and valve seat, said housing having a port positioned so that said extension lies between said port and said plug, a pusher slidably mounted in said housing and adapted to seat against the free end of said extension, said pusher having a passage from its inner end and an exhaust port from said passage adapted to lie outside of said housing when the pusher is retracted from said extension, and means for sealing said exhaust port when said pusher engages said extension.

References Cited in the file of this patent

UNITED STATES PATENTS

| Number | Name | Date |
|---|---|---|
| 851,220 | Bowers | Apr. 23, 1907 |
| 991,550 | Serrell | May 9, 1911 |
| 1,144,758 | Desmond | June 29, 1915 |
| 1,657,658 | Buford | Jan. 31, 1928 |
| 2,254,253 | Williams | Sept. 2, 1941 |
| 2,311,806 | Almond | Feb. 23, 1943 |

FOREIGN PATENTS

| Number | Country | Date |
|---|---|---|
| 362,573 | Italy | 1938 |